July 23, 1940.　　　A. L. PARKER　　　2,209,135
VALVE ASSEMBLY
Filed Oct. 15, 1938
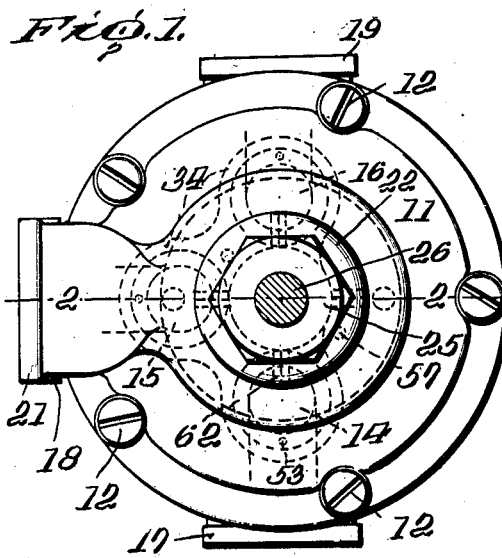
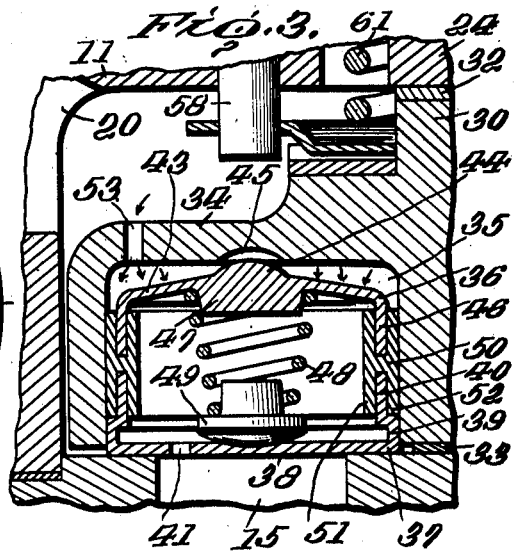
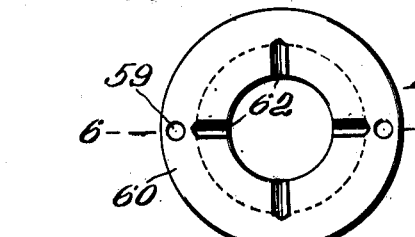
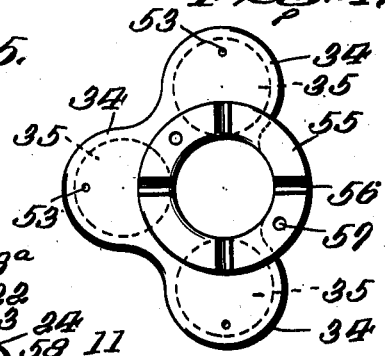
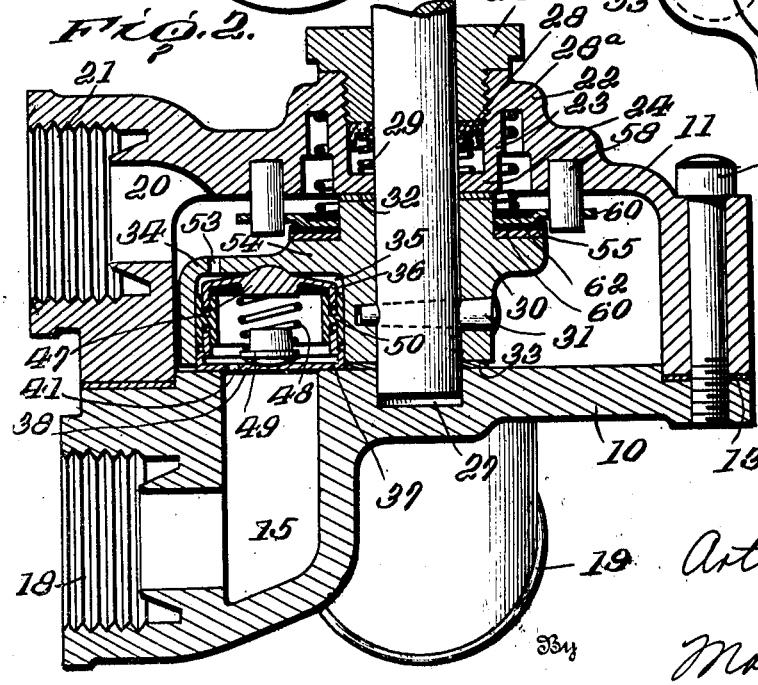
Inventor
Arthur L. Parker
By Mason & Porter
Attorneys Patented July 23, 1940

2,209,135

UNITED STATES PATENT OFFICE 2,209,135

VALVE ASSEMBLY

Arthur L. Parker, Cleveland, Ohio

Application October 15, 1938, Serial No. 235,201

16 Claims. (Cl. 251—84)

The present invention relates to new and useful improvements in a valve assembly for controlling the passage of fluid, and more particularly to improvements in a valve assembly of the general type shown and described in Letters Patent No. 2,075,458, granted to me on March 20, 1937, and in my co-pending application, Ser. No. 214,756, filed June 20, 1938.

In the above prior patent, there is shown a valve assembly which is adapted to selectively control the passage of fluid under pressure through a plurality of ports. The valve assembly is one which is particularly adapted to selectively control the passage of fluid from a series of inlet ports to an outlet port, or vice versa. The valve assembly of the above patent includes generally a body portion having a seat provided with a plurality of inlet ports, and a chambered cap which is attached to the body portion and which covers the seat. The cap is provided with an outlet or discharge port, and a valve member is disposed within the space between the cap and said seat and is in the form of a disk rotatably mounted therein for selectively controlling the passage of fluid through the ports. The valve disk is illustrated as being flexible, and means are provided for turning the valve disk and for flexing the same centrally of the ports in the valve seat so as to afford a tight sealing contact therewith.

In my co-pending application referred to above, the valve member is in the form of an operating member which has pockets or recesses spaced symmetrically with respect to the inlet ports in the valve body. These pockets or recesses open downwardly toward the inlet ports in the valve body and are sealed with respect to the chamber between the cap and the valve seat, and are substantially closed by flexible valve inserts which are adapted to be flexed centrally of a port when closed. Each of the valve inserts is provided with a small aperture therethrough so that the fluid under pressure in the inlet ports may pass to the pocket or recess above the valve inserts and thus be utilized for exerting a seating pressure thereon. Thus, any increased pressure in the inlet line will effect a correspondingly increased seating pressure on the valve insert when the port is closed.

With this form of valve assembly, there are some disadvantages, as for instance, when the port in the cap is used as the inlet port and the ports in the valve body are used as the outlet or discharge ports. When the valve assembly is used in this manner, it will be seen that the pressure of the incoming fluid flowing into the chamber between the cap and the valve body cannot gain access to the space within the recesses or pockets in the valve operating member for exerting a seating pressure on the valve inserts because these pockets or recesses are sealed with respect to the chamber between the cap and the valve body. Thus, only spring means are available for exerting a seating pressure on the valve inserts. Similarly, in this form of valve assembly, even if the ports in the valve body are inlet ports connected to several inlet supply tanks, one of which has been drained and the other of which is placed in communication with the outlet port in the cap, there may be a tendency for the fluid under pressure in the valve chamber to leak into the drained or empty tank for the reason that there is only spring pressure tending to seat the valve insert closing the port to the empty or drained tank.

According to the present invention, there is provided a valve assembly which will overcome the above disadvantages, and one of the principal objects of the present invention is to provide a valve assembly wherein fluid pressure is utilized at all times to maintain the desired port or ports tightly sealed.

A further object of the invention is to provide a valve of the above type, wherein a valve insert for sealing a port is always maintained in sealing contact with the edge of the port by fluid pressure regardless of the direction of flow of the fluid through the valve assembly.

A still further object of the invention is to provide a valve assembly of the above type, wherein a valve operating member carries a sealing member against which fluid under pressure is exerted for effecting seating pressure thereon regardless of the direction of flow of the fluid through the valve assembly.

A still further object of the invention is to provide a valve assembly of the above type, wherein the sealing member or valve insert is apertured, through which fluid under pressure flowing in one direction may pass for exerting a seating pressure thereon, and wherein fluid under pressure flowing in the opposite direction may be directed through the valve operating member for exerting a seating pressure on the valve insert.

A still further object of the invention is to provide a valve assembly of the above type, wherein the valve insert consists of a pair of parts forming a chamber into which fluid under pressure flowing in one direction may be directed for exerting a seating pressure on the insert, and wherein fluid under pressure flowing in the opposite direction may be directed externally against the valve insert for exerting a seating pressure thereon.

The invention still further aims to provide a valve assembly of the above type, wherein the valve inserts are housed within pockets or recesses in the valve operating member for movement therewith, and wherein the valve operating member is apertured so that fluid under pressure flowing in one direction may be directed to the pockets or recesses for exerting a seating pressure on the valve inserts.

The above and other objects of the invention will in part be obvious and will be hereinafter more fully pointed out.

In the accompanying drawing:

Figure 1 is a top plan view showing the improved valve assembly.

Figure 2 is an enlarged sectional view taken along the line 2—2 of Figure 1, showing one valve insert seated by fluid under pressure flowing in through ports in the valve seat.

Figure 3 is a further enlarged fragmentary view, in section, showing one valve insert seated by fluid under pressure flowing through the valve operating member.

Figure 4 is a detail plan view of the valve operating member.

Figure 5 is a detail plan view of the indicator disk which is secured to the valve cap.

Figure 6 is a sectional view of the indicator disk taken along the line 6—6 of Figure 5.

Figure 7 is a sectional view of a cooperating indicator disk which is carried by the valve operating member, as shown in Figure 4.

Referring more in detail to the accompanying drawing, the valve assembly, as shown in the illustrated embodiment of the invention, includes a body portion 10 and a chambered cap 11 which is secured to the body portion by means of bolts 12 or the like. A gasket 13 is disposed between the cap and the body portion for preventing any leakage of fluid. Thus, the chambered cap 11 and the body portion 10 provide a valve casing which has an internal chamber. The body portion 10 is provided with a plurality of ports 14, 15, 16 which open upwardly through the face thereof. These ports communicate with internally threaded coupling members 17, 18, 19, respectively, to which suitable conduits may be attached. The conduits leading from the couplings 17, 18, 19 may be connected to separate fluid supply tanks so that the ports 14, 15, 16 serve as inlet ports or, on the other hand, the conduits may be connected to separate fluid delivery tanks, in which case the ports in the valve body serve as outlet ports. The face of the valve body portion 10 provides a valve seat for the sealing members or valve inserts which will be hereinafter more fully described. The cap 11 is provided with a port 20 which communicates with an internally threaded coupling 21. A suitable conduit may be connected to the coupling 21 and may serve as an inlet or outlet port, depending upon the manner in which the valve assembly is installed.

The top of the valve cap 11 is provided with an elevated portion 22 which surrounds an opening defined by a depending skirt portion 23, the lower edge of which is inturned to provide a shoulder, as at 24. The inner surface of the depending skirt portion 23 is threaded at the top thereof to receive a threaded locking or packing nut 25 through which a valve stem 26 extends. The end of the valve stem 26 extends into and is properly located in a recess 27 in the valve body 10. A packing washer 28 is disposed around the valve stem 26 beneath the lower end of the nut 25. This packing washer is provided with depending annular skirt portions 28a between which one end of a coil spring 29 is disposed. The opposite end of the spring 29 bears against the shoulder 24 on the depending portion 23 so that the spring serves to maintain the washer 28 in tight sealing contact with the valve stem 26, the nut 28 and the depending skirt portion 23.

The hub portion 30 of a valve operating member is disposed between the cap 11 and the sealing surface of the body portion 10 and is secured to the valve stem 26 by means of a pin or key 31. Thus, rotation of the valve stem 26 will effect corresponding rotation of the valve operating member. There is a spacing washer 32 between the upper end of the hub portion 30 and the under face of the shoulder 24. There is a similar spacing or thrust washer 33 between the face of the valve body 10 and the lower end of the hub portion 30. The hub portion 30 of the valve operating member is provided with a plurality of laterally extending portions 34. These laterally extending portions 34 are illustrated as being 3 in number and are spaced symmetrically with respect to the ports 14, 15, 16 in the valve body 10. Each of the lateral extensions 34 is shaped to provide a pocket or recess 35 which opens downwardly toward the seating face of the valve body 10. These pockets or recesses 35 are adapted to house valve inserts or sealing members and the following description of one will serve to describe each of them.

Referring more in detail to Figures 2 and 3 of the accompanying drawing, each valve insert or sealing member is illustrated as including upper and lower cup-shaped disks 36, 37, respectively. The lower disk 37 includes a sealing portion 38 which is adapted to cooperate with the edges of the ports in the valve body 10 for sealing the same. This sealing portion 38 is preferably substantially rigid, although there may be a tendency for the same to flex under the action of the seating pressure. However, a slightly flexible form of insert may be employed, as in my copending application referred to above. The lower disk 37 also includes an upstanding peripheral wall portion 39 which snugly fits within the inner edge of the pocket or recess formed by the arm 34. The wall portion 39 extends upwardly and is inwardly offset, as at 40, around the upper edge thereof. The sealing portion 38 of the disk 37 is provided with an aperture 41 therethrough which is adapted to communicate with one of the ports in the valve body, depending upon the position of the valve operating member.

The upper disk 37 is provided with a closed end portion 43 which is provided with a centrally located upstanding boss 4 which is adapted to cooperate with a similarly shaped recess 45 in the under surface of the radial arm 34. The disk 36 is also provided with a depending skirt portion 46 which is disposed in alignment with the inwardly offset portion 40 of the disk 36. The inner surface of the end portion 43 of the disk 36 is provided with a depending lug 47 around which one end of a coil spring 48 is disposed. The opposite end of the coil spring 48 abuts against a button member 49 which bears against the sealing portion 38 of the disk 37. Thus, the spring 48 normally tends to maintain the disks 36, 37 separated and to press the sealing portion 38 of the disk 37 into sealing contact with the face of the body portion 10. An annular sealing washer 50 is disposed between the adjacent edges of the skirt portions 46, 40 of the disks 36, 37, respectively. The sealing washer is provided with inner and outer skirt portions 51, 52, respectively, which extend in opposite directions so as to enclose the adjacent edges of the skirt portions 46 and 40 of the disks. The sealing or packing washer 50 may be made of any suitable packing material which is somewhat resilient and which is highly resistant to corrosion.

The disks 36, 37 and the packing washer 50 thus provide an internal chamber disposed within the pocket in the radial arm 34 of the valve operating member. The disks 36, 37 are permitted slight axial movement relative to one another by the packing washer 50. The radial arm 34 of the valve operating member is provided with an aperture 53 which affords communication between the valve chamber beneath the cap 11 and the pocket or recess 35 within each arm 34.

When the ports 14, 15, 16 in the valve body 10 serve as inlet ports from separate supply tanks and when all of these ports are closed by the valve inserts, fluid under pressure will be directed through the aperture 41 in each disk 37 and into the chamber provided by the disks 36, 37. In this position of the valve operating member which, when moved, effects corresponding movement of each of the valve inserts, the disks 36, 37 are somewhat separated, as shown in Figure 2, with the boss 44 seated within the recess 45 in an arm 34. The inner or upper area of the portion 38 of the disk 37 is greater than the area of the outer or under surface of the portion 38 and receives upward pressure from the fluid in one of the inlet ports so that the fluid pressure within the chamber formed by the disks 36, 37 will exert a downward sealing pressure on the portion 38. This sealing pressure is augmented by the spring 48 and any increased pressure in the inlet ports will effect a correspondingly increased seating or sealing pressure on the portion 38 on the disk 37. The skirt portions of the packing washer 50 overlie the portions 46, 40 of the disks 36, 37, respectively, so that the fluid pressure within the valve insert will press the inner skirt portion 51 outwardly so as to seal the chamber and prevent any leakage into the pocket or recess 35.

When it is desired to pass fluid from one of the ports outwardly through the port in the chambered cap 11, it is simply necessary to manipulate the valve stem 26 so as to shift the valve operating member and the valve inserts to the proper position to afford communication between one of the inlet ports and the port 20 through the chamber provided in the valve casing. If, in such a position of the valve, one of the closed inlet ports is connected to an empty supply tank, the fluid under pressure passing through the chamber between the cap and the body portion 10 will gain access to the pocket or recess 35 over the port leading to the empty tank. This fluid under pressure gains access to the particular pocket 35 through the aperture 53 in the corresponding radial arm 34. As shown in Figure 3, the fluid under pressure passing into the chamber 35 will exert a downward pressure on the disk 36 and cause the same to move downwardly, thus compressing the packing washer 50 and compressing the spring 48. There is, therefore, fluid pressure utilized to seat the sealing portion 38 of the disk 37 so as to guard against the possibility of any fluid leaking into the port leading to the empty tank. In this position of the valve insert, the packing washer 50, being compressed, will prevent leakage of fluid from the chamber 35.

As heretofore pointed out, the valve assembly may be installed with the port 20 in the cap 11 serving as the inlet port and with the ports 14, 15, 16 in the valve body 10 serving as the outlet ports. When the valve assembly is installed in this manner, fluid under pressure flowing into the valve casing through the port in the cap thereof will pass through the apertures 53 in the radial arms 34 to exert a seating pressure on the portion 38 of the disk 37 in the manner described above. There is thus provided a valve assembly wherein the desired ports are sealed under the influence of fluid pressure under all conditions of use to which the valve assembly may be put.

There is also provided an indicator mechanism for properly locating the valve operating member in any one of its several positions. The hub portion 30 of the valve operating member is provided with an annular shoulder 54 on the upper surface of which is secured a plate 55. This plate is provided with V-shaped notches 56, as shown in Figures 4 and 7. The number of notches are, of course, determined by the number of ports provided in the valve body. The plate 55 may be secured to the shoulder portion 54 by rivets 57 or the like so that rotation of the valve operating member and the valve stem 26 will effect corresponding rotation of the plate.

The cap 11 has a pair of depending pins 58 which extend downwardly into the chamber within the valve casing. These pins 58 extend through corresponding openings 59 in a spring pressed ratchet plate 60 which cooperates with the plate 55 on the valve operating member. The plate 60 is held by the pins 58 against rotation. A coil spring 61 surrounds the depending portion 23 on the cap 11 and has one end thereof abutting against the cap and the opposite end thereof abutting against the plate 60 so that the plate is normally forced downwardly into contact with the plate 55 on the valve operating member. The plate 60, as shown in Figures 5 and 6, is provided with downwardly extending rounded projections or lugs 62 which are spaced thereon symmetrically with respect to the notches 56 in the plate 55. Thus, the plates 55 and 60 serve as an indicating mechanism for positioning the valve operating member in its various positions. The spring 61 permits upward movement of the plate 60 when the valve operating member is turned so that succeeding lugs and notches may be brought into register with one another.

If desired, the port 20 in the cap 11 may be omitted, thus providing a closed cap. In this connection, fluid may be selectively controlled in its passage through the ports in the valve body by an appropriate shaping or placing of the radial arms 34 on the valve operating member.

From the foregoing description, it will be seen that the present invention provides an improved valve assembly which can be installed and be used with a single inlet port serving a plurality of outlet ports, or it can be installed and be used with a plurality of inlet ports serving a single outlet port. The valve assembly is one which is adapted to selectively control communication between the ports. In all conditions of installation, the valve assembly is one wherein the pressure of the fluid is at all times utilized to exert a seating pressure on the valve inserts or sealing members, thus assuring that there will be no leakage of fluid, as for instance, no leakage of fluid into a drained or empty tank.

While one form of assembly has been shown in the accompanying drawing for purposes of illustration, it is to be clearly understood that various changes in the details of construction and arrangement of parts may be made without departing from the scope of the invention as set forth in the appended claims.

I claim:

1. A valve assembly for controlling the passage of fluid under pressure, comprising a valve casing having a port therethrough, a valve operating member mounted within said casing and having a pocket opening downwardly and overlying the port when closed, a valve insert movable with said pocket and adapted to overlie the port for closing the same, said valve insert having an aperture therethrough for directing fluid under pressure flowing in one direction against the valve insert to exert a seating pressure thereon, and means including a passage extending into said pocket for directing fluid flowing in the opposite direction against the valve insert to exert a seating pressure thereon.

2. A valve assembly for controlling the passage of fluid under pressure, comprising a valve body having a port therethrough, a chambered cap secured to said valve body and having a port therethrough, a valve operating member mounted within said cap and having a radial arm shaped to provide a recess opening downwardly and adapted to overlie the port in said valve body when the port is closed, valve means disposed within said recess and movable with said valve operating member and adapted to overlie the port in said valve body for closing the same, and means for utilizing fluid under pressure regardless of the direction of flow of the fluid through the ports to exert a seating pressure on said valve means, said means including a passage through said radial arm for directing fluid under pressure against said valve means when the fluid is flowing in one direction and an aperture associated with said valve means for directing fluid under pressure from the port in said valve body against said valve means when the fluid is flowing in the opposite direction.

3. A valve assembly for controlling the passage of fluid under pressure, comprising a valve body having a port therethrough, a chambered cap secured to said valve body and having a port therethrough, a valve operating member mounted within said cap and having a radial arm shaped to provide a recess opening downwardly and adapted to overlie the port in said valve body when the port is closed, valve means disposed within said recess and movable with said valve operating member, said valve means including a pair of relatively movable parts providing a chamber, sealing means between said valve parts for closing the chamber with respect to the recess in said radial arm, one of said valve parts being adapted to overlie the port in said valve body for closing the same and having an aperture therethrough permitting the passage of fluid under pressure flowing in one direction from the port into said chamber whereby the fluid under pressure is utilized to separate said valve parts and to exert a seating pressure on the apertured part, and a passage through said radial arm into said recess for directing fluid under pressure flowing in the opposite direction against the other of said valve parts to cause relative movement of the parts toward one another and to exert a fluid seating pressure on said valve means.

4. A valve assembly for controlling the passage of fluid under pressure, comprising a valve body having a port therethrough, a chambered cap secured to said valve body and having a port therethrough, a valve operating member mounted within said cap and having a radial arm shaped to provide a recess opening downwardly and adapted to overlie the port in said valve body when the port is closed, valve means disposed within said recess and movable with said valve operating member, said valve means including a pair of relatively movable members and sealing means between said members for providing a closed chamber therebetween, spring means for normally separating said relatively movable members, one of said relatively movable members adapted to overlie the port in said valve body for closing the same and having an aperture therethrough permitting the passage of fluid under pressure flowing in one direction from the port into said chamber whereby the fluid under pressure is utilized to separate said members and to exert a seating pressure on the apertured member, and a passage through said radial arm into said recess for directing fluid under pressure flowing in the opposite direction against the other of said relatively movable members to compress said spring means and to exert a fluid seating pressure on said valve means.

5. A valve assembly for controlling the passage of fluid under pressure, comprising a valve body having a plurality of ports therethrough, a chambered cap secured to said valve body and having a port therethrough, a valve operating member mounted within said cap and having a plurality of radial arms spaced symmetrically with respect to the ports in said valve body, each of said radial arms being shaped to provide a recess opening downwardly and adapted to overlie a corresponding port in said valve body when the port is closed, valve means disposed within each of said recesses and movable with said valve operating member and adapted to overlie a corresponding port in said valve body for closing the same, and means for utilizing fluid under pressure regardless of the direction of flow of the fluid through the ports to exert a seating pressure on said valve means, said means including a passage through each of said radial arms for directing fluid under pressure against said valve means when the fluid is flowing in one direction and an aperture associated with each of said valve means for directing fluid under pressure from the ports in said valve body against said valve means when the fluid is flowing in the opposite direction.

6. A valve assembly comprising a valve casing having a port therethrough, a valve operating member mounted within said casing and having a pocket overlying the port when closed, a valve insert mounted within said pocket and movable therewith and adapted to overlie the port for closing the same, said valve insert having an aperture therethrough in communication with the port when closed for directing fluid under pressure flowing in one direction against the valve insert to exert a seating pressure thereon, and means including a passage extending into said pocket for directing fluid under pressure flowing in the opposite direction against the valve insert to exert a seating pressure thereon.

7. A valve assembly for controlling the passage of fluid under pressure, comprising a valve casing having a port therethrough, a valve operating member mounted within said casing and having a pocket opening downwardly toward the port and adapted to overlie the port when closed, valve means movable with said valve operating member and including relatively movable parts defining a chamber within said pocket, one of said parts adapted to overlie the port for closing the same and having an aperture therethrough permitting the passage of fluid under pressure flowing in one direction from the port into said chamber whereby the fluid under pressure is utilized to exert a seating pressure on the apertured part of said valve means, and means for directing fluid under pressure flowing in the opposite direction against the other part of said valve means for exerting a seating pressure thereon.

8. A valve assembly for controlling the passage of fluid under pressure, comprising a valve casing having a port therethrough, a valve operating member mounted within said casing and having a radial arm shaped to provide a recess adapted to overlie the port when the port is closed, valve means disposed within said recess and movable with said valve operating member and adapted to overlie the port for closing the same, and means for utilizing fluid under pressure regardless of the direction of the flow of fluid through the port to exert a seating pressure on said valve means and including a passage through said radial arm for directing fluid under pressure against said valve means when the fluid is flowing in one direction and an aperture associated with said valve means for directing fluid under pressure from the port against said valve means when the fluid is flowing in the opposite direction.

9. A valve assembly for controlling the passage of fluid under pressure, comprising a valve casing having a port therethrough, a valve operating member mounted within said casing, a valve insert movable with said valve operating member and including a pair of relatively movable disk members defining a chamber therebetween, a sealing gasket disposed between said relatively movable disk members for sealing the chamber therebetween, one of said disk members being adapted to overlie the port for closing the same and having an aperture therethrough for directing fluid under pressure flowing in one direction against the valve insert to exert a seating pressure thereon, and means for directing fluid under pressure flowing in the opposite direction against the other of said disk members for exerting a seating pressure on the valve insert.

10. A valve assembly for controlling the passage of fluid under pressure, comprising a valve casing having a port therethrough, a valve operating member mounted within said casing and having a pocket opening downwardly toward the port and adapted to overlie the port when the port and closed, valve means movable with said valve operating member and including relatively movable disk members having skirt portions defining a chamber within said pocket, a sealing gasket between the ends of said skirt portions for sealing the chamber with respect to said pocket, one of said disk members adapted to overlie the port for closing the same and having an aperture therethrough permitting the passage of fluid under pressure flowing in one direction from the port into the chamber whereby the fluid under pressure is utilized to exert a seating pressure on the apertured disk member, and means for directing fluid under pressure flowing in the opposite direction against the other of said disk members for exerting a seating pressure on the valve means.

11. A valve assembly for controlling the passage of fluid under pressure, comprising a valve casing having a port therethrough, a valve operating member mounted within said casing and having a pocket opening downwardly toward the port and adapted to overlie the port when closed, valve means movable with said valve operating member and including relatively movable disk members defining a chamber within said pocket, a sealing gasket disposed between said disk members and having skirt portions overlying the adjacent edges of said disk members for sealing the chamber with respect to said pocket, one of said disk members adapted to overlie the port for closing the same and having an aperture therethrough permitting the passage of fluid flowing in one direction from the port into the chamber whereby the fluid under pressure is utilized to exert a seating pressure on the apertured disk member, and means for directing fluid under pressure flowing in the opposite direction against the other of said disk members for exerting a seating pressure on the valve means.

12. A valve assembly for controlling the passage of fluid under pressure, comprising a valve casing, a rotatable valve operating member mounted within said casing, said casing having a flat seating surface disposed in a plane perpendicular to the axis of rotation of said valve operating member and provided with a port therethrough, a valve insert carried radially of said valve operating member and movable therewith over the flat seating surface and having one face thereof adapted to overlie the port for closing the same, and means providing fluid passages for utilizing the fluid under pressure flowing in either direction through the port in the valve casing to exert a seating pressure on the valve insert when the port is closed.

13. A valve assembly for controlling the passage of fluid under pressure, comprising a valve casing, a rotatable valve operating member mounted within said casing, said casing having a flat seating surface disposed in a plane perpendicular to the axis of rotation of said valve operating member and provided with a port therethrough, said valve operating member having a radially disposed pocket opening downwardly toward the flat seating surface and overlying the port when closed, a valve insert disposed in said pocket and movable with the valve operating member over the flat seating surface and having one face thereof adapted to overlie the port for closing the same, and means providing fluid passages for utilizing the fluid under pressure flowing in either direction through the port in the valve casing to exert a seating pressure on the valve insert when the port is closed.

14. A valve assembly for controlling the passage of fluid under pressure, comprising a valve casing, a rotatable valve operating member mounted within said casing, said casing having a flat seating surface disposed in a plane perpendicular to the axis of rotation of said valve operating member and provided with a port therethrough, said valve operating member having a radially disposed pocket opening downwardly toward the flat seating surface and overlying the port when closed, valve means movable with said valve operating member and including relatively movable parts disposed within said pocket and defining a chamber, said parts being relatively movable in a direction parallel to the axis of rotation of said valve operating member, one of said parts being adapted to move over the flat seating surface and to overlie the port for closing the same, and means providing fluid passages for directing fluid under pressure into said chamber or against another of said parts whereby to utilize fluid under pressure flowing in either direction through the port in the valve casing for exerting a seating pressure on the valve means.

15. A valve assembly for controlling the passage of fluid under pressure, comprising a valve casing including a valve body and a cap defining a chamber within the valve casing; means providing a valve seat on said valve body with a plurality of ports opening therethrough, said valve cap having at least one port extending therethrough and communicating with the chamber, a valve operating member rotatably mounted within the chamber and having a plurality of separate valve members carried radially thereof and adapted to separately cooperate with the ports in said valve seat for controlling the passage of fluid, and means providing fluid passages for directing fluid under pressure into contact with said valve members regardless of the direction of flow of fluid through the ports whereby to utilize fluid under pressure flowing through any of said ports in any direction for exerting a fluid seating pressure on said valve members.

16. A valve assembly for controlling the passage of fluid under pressure, comprising a valve casing including a valve body and a cap defining a chamber within the valve casing; a valve operating member rotatably mounted within the chamber and having a plurality of separate valve members carried radially thereof, means providing a valve seat on said valve body disposed in a plane perpendicular to the axis of rotation of said valve operating member and having a plurality of ports opening therethrough, said valve cap having at least one port extending therethrough and communicating with the chamber and said valve members being adapted to separately cooperate with the ports in said valve seat for controlling the passage of fluid, and means providing fluid passages for directing fluid under pressure into contact with said valve members regardless of the direction of flow of fluid through the ports whereby to utilize fluid under pressure flowing through any of said ports in any direction for exerting a fluid seating pressure on said valve members.

ARTHUR L. PARKER.